(12) United States Patent
Dong et al.

(10) Patent No.: US 8,103,323 B2
(45) Date of Patent: Jan. 24, 2012

(54) SLIDE MECHANISM FOR SLIDE-TYPE PORTABLE ELECTRONIC DEVICE

(75) Inventors: Shui-Jin Dong, Shenzhen (CN); Yu Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 301 days.

(21) Appl. No.: 12/475,679

(22) Filed: Jun. 1, 2009

(65) Prior Publication Data

US 2010/0085721 A1  Apr. 8, 2010

(30) Foreign Application Priority Data

Oct. 6, 2008 (CN) .......................... 2008 1 0304758

(51) Int. Cl.
*H04M 1/00* (2006.01)
(52) U.S. Cl. ............... 455/575.4; 455/575.1; 455/575.2; 455/575.3; 292/17; 361/679.01; 361/814
(58) Field of Classification Search .... 455/575.1–575.4; 361/679.39, 679.55, 807, 814, 679.01; 267/69; 292/17; 384/26

See application file for complete search history.

(56) References Cited

U.S. PATENT DOCUMENTS

| 7,158,818 | B2 * | 1/2007 | Lee | 455/575.4 |
| 7,369,884 | B2 * | 5/2008 | Park et al. | 455/575.4 |
| 7,496,389 | B2 * | 2/2009 | Cho et al. | 455/575.4 |
| 7,542,788 | B2 * | 6/2009 | Lee | 455/575.4 |
| 7,725,143 | B2 * | 5/2010 | Liu | 455/575.4 |
| 7,773,374 | B2 * | 8/2010 | Dong et al. | 361/679.39 |
| 7,885,693 | B2 * | 2/2011 | Park et al. | 455/575.4 |
| 2009/0156274 | A1 * | 6/2009 | Wang | 455/575.4 |
| 2009/0290302 | A1 * | 11/2009 | Dong et al. | 361/679.55 |

FOREIGN PATENT DOCUMENTS

| CN | 1612575 A | 5/2005 |
| CN | 1725778 A | 1/2006 |
| CN | 1874667 A | 12/2006 |

* cited by examiner

*Primary Examiner* — Angel R Estrada
*Assistant Examiner* — Dimary Lopez
(74) *Attorney, Agent, or Firm* — Altis Law Group, Inc.

(57) ABSTRACT

A slide mechanism used in portable electronic device is described including a main plate, a slide plate, two sliders, and two guiders. The slide plate can be installed on the main plate and slideable relative to the main plate. The sliders can be attached to the slide plate. The guiders can be attached to the main plate and configured for deformably guiding the sliders to move therealong, the sliders positioned between the guiders. During the sliding process of the slide plate with respect to the main plate, the sliders deform the guiders to slide the slide plate along the main plate.

14 Claims, 7 Drawing Sheets

SLIDE MECHANISM FOR SLIDE-TYPE PORTABLE ELECTRONIC DEVICE

CROSS-REFERENCE TO RELATED APPLICATION

This application is related to co-pending U.S. patent application Ser. No. 12/475,680, entitled "SLIDE MECHANISM FOR SLIDE-TYPE PORTABLE ELECTRONIC DEVICE", by Shui-Jin Dong et al., which has the same assignee as the present application. The above-identified application is incorporated herein by reference.

BACKGROUND

1. Technical Field

The present disclosure generally relates to slide mechanisms and, particularly, to a portable electronic device with two or more housings using a sliding mechanism that allows one housing to slide over another housing in a longitudinal direction.

2. Description of Related Art

Slide-type portable electronic devices have been increasingly used among diverse designs for portable electronic devices. The slide-type portable electronic device has two housings, of which one slides over the other to open/close the portable electronic device.

A slide mechanism is generally used in the slide-type portable electronic device for driving the sliding between the two housings. However, the slide mechanism is typically complex in structure and usually difficult to assemble within the portable electronic device. As a result of the structural complexity and assembling difficulty, production costs can be high.

Therefore, there is room for improvement within the art.

BRIEF DESCRIPTION OF THE DRAWINGS

Many aspects of the new slide mechanism for slide-type portable electronic device can be better understood with reference to the following drawings. The components in the drawings are not necessarily drawn to scale, the emphasis instead being placed upon clearly illustrating the principles of the new slide mechanism for slide-type portable electronic device. Moreover, in the drawings, like reference numerals designate corresponding parts throughout the several views.

DETAILED DESCRIPTION

Figure 1:
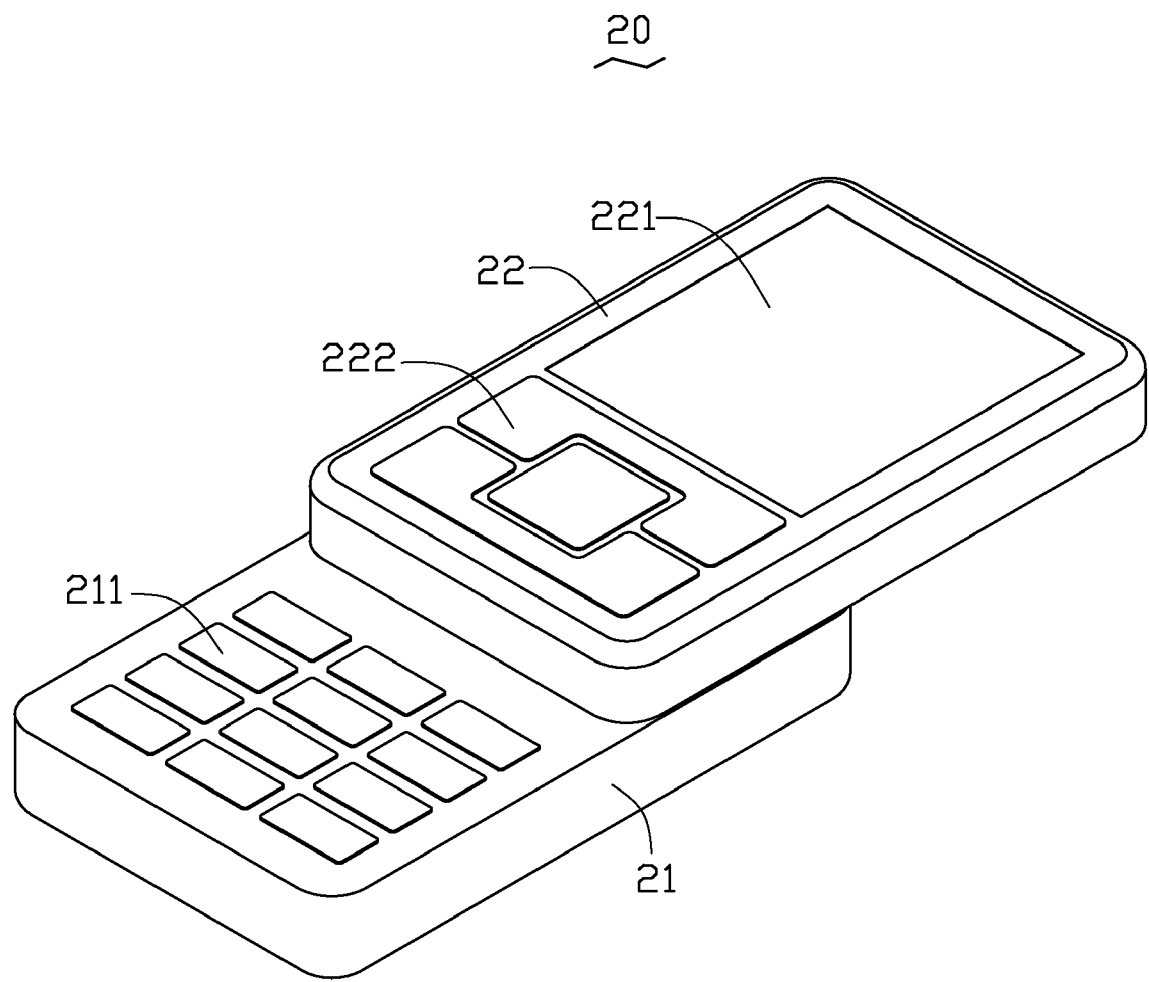
FIG. 1 is an isometric view of a portable electronic device at an opened state using a slide mechanism according to an exemplary embodiment.
Figure 7:
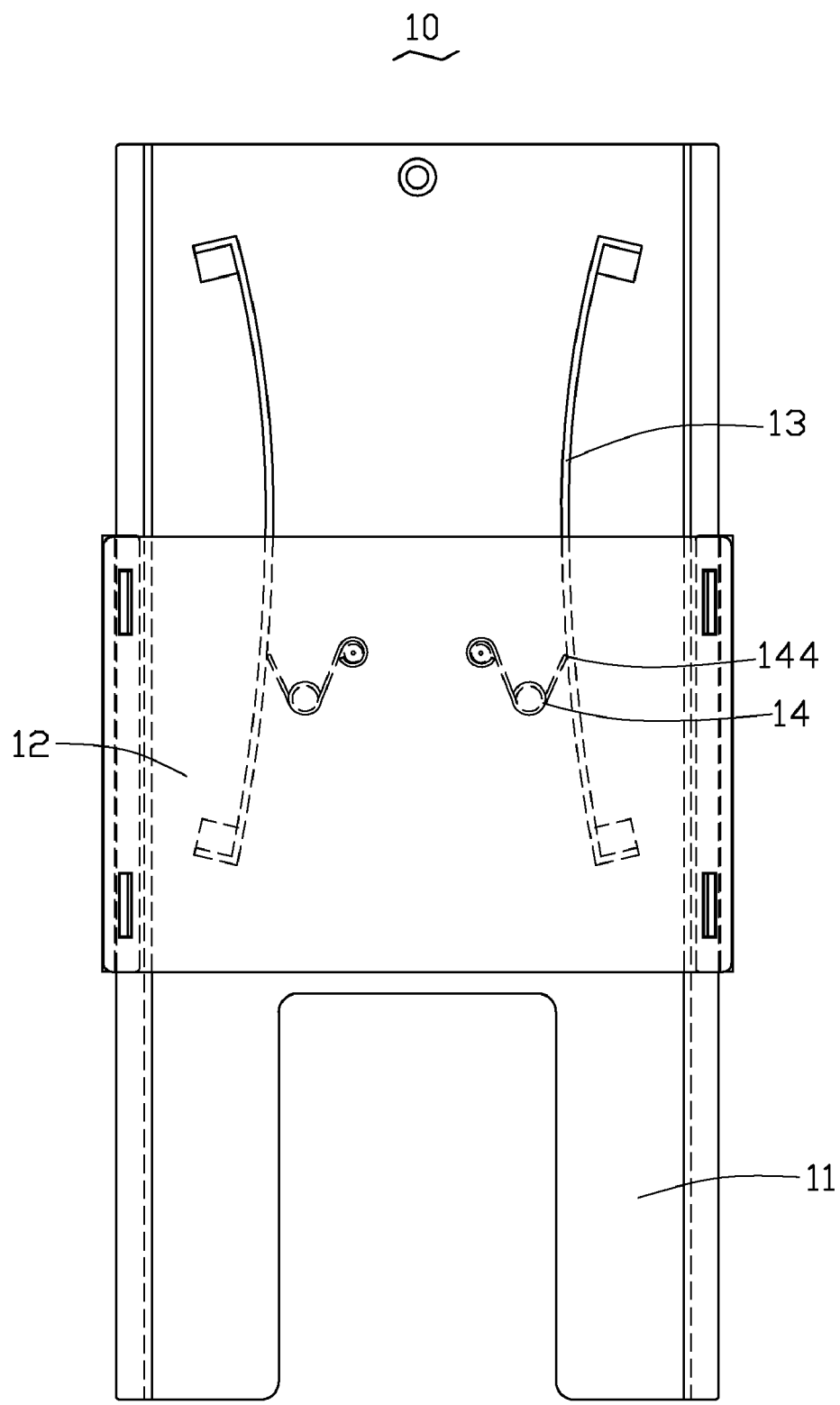
FIG. 7 is similar to FIGS. 5 and 6, but in a closed position.

FIGS. 1 and 7 show an exemplary slide mechanism 10 used in a slide-type portable electronic device 20 such as a mobile phone, a personal digital assistant, etc. The portable electronic device 20 includes a first housing 21 and a second housing 22 engaging with the first housing 21. The slide mechanism 10 generates an elastic force sufficient to slide the first and second housings 21 and 22 relative to each other. The first housing 21 may have a keypad 221. The second housing 22 may have a display 221 and several keys 222. The second housing 22 can slide lengthwise over the first housing 21, thus exposing or covering the keypad 32.

Figure 2:
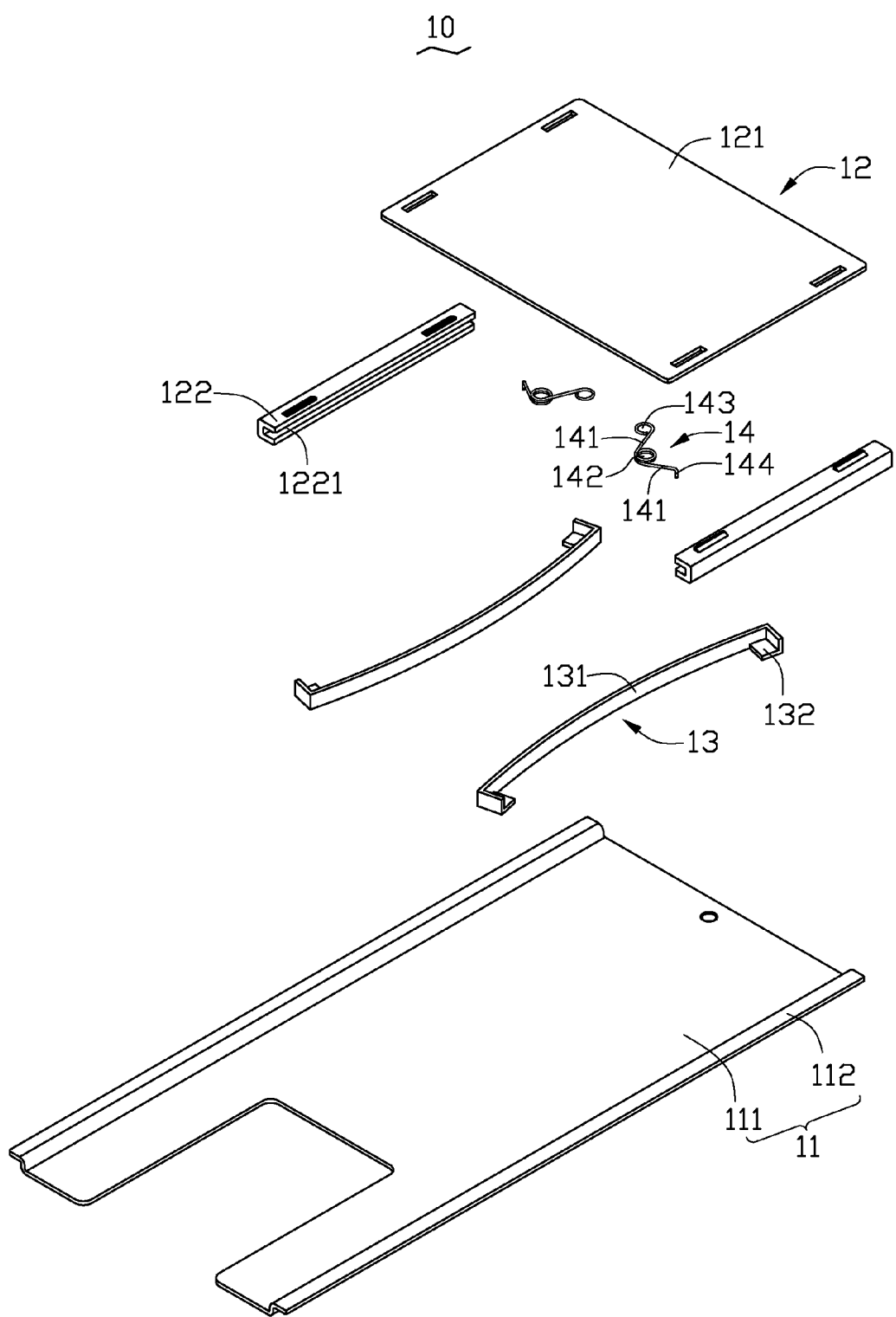
FIG. 2 is an exploded and isometric view of the slide mechanism used in the portable electronic device illustrated in FIG. 1.
Figure 3:
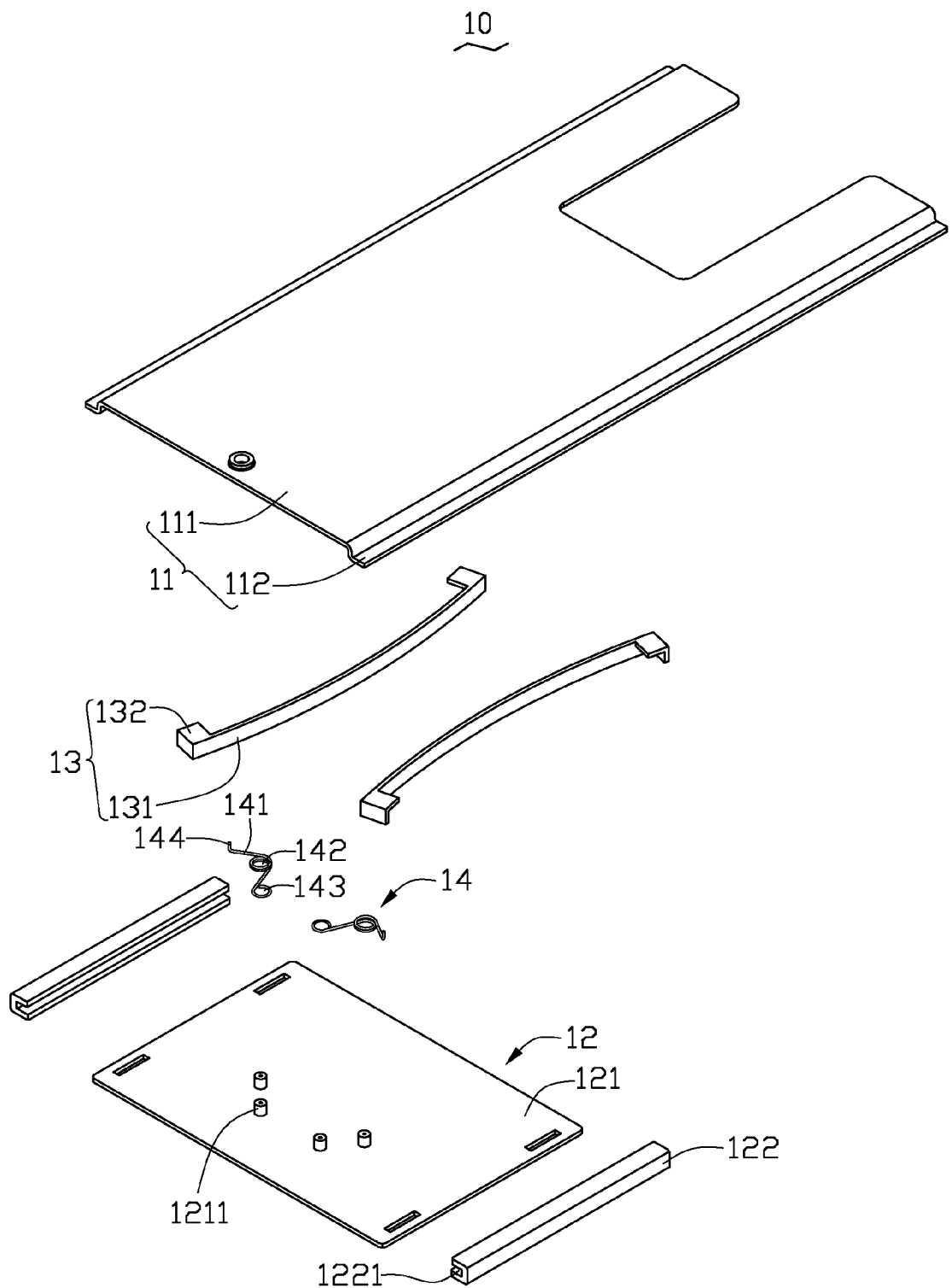
FIG. 3 is similar to FIG. 2 but showing another aspect of the slide mechanism.

Referring to FIGS. 2 and 3, the slide mechanism 10 includes a main plate 11, a slide plate 12, two guiders 13 fixed to the main plate 11, and two sliders 14 fixed to the slide plate 12. The slide plate 12 and the main plate 11 are fixed to the second housing 22 and the first housing 21, respectively. The sliders 14 can slide along the guiders 13, thereby driving the sliding of the slide plate 12 relative to the main plate 11.

The main plate 11 includes a main base portion 111 and two generally L-shaped rail portions 112. Two opposite edge ends of the base portion 11 extend the two rail portions 112 upwardly. The slide plate 12 is shorter than the main plate 11. The slide plate 12 includes a slide base portion 121 and two slide portions 122. Two opposite borders of the slide base portion 121 directly fix the two slide portions 122 on a same side of the slide base portion 121. The two slide portions 122 are generally U-shaped bars defining a slide groove 1221 corresponding to the two rail portions 112. The slide base portion 121 has four positioning columns 1211 protruding from a surface thereof. The two slide portions 122 can be attached to the same surface of the slide base portion 121 adjacent to the four positioning columns 1211.

The guiders 13 each have a generally arcuate guide portion 131 and two fixing portions 132. The guide portion 131 is an elastically deformable sheet. Two opposite ends of the guide portion 131 horizontally extend (e.g., co-molding) along the two fixing portions 132. The two fixing portions 132 are configured for fixing the guider 13 to the main base portion 111 by way of, for example, hot melting.

Each slider 14 is a torsion spring having two connecting arms 141 connected at an acute angle. The connecting portion of the two connecting arms 141 forms a first positioning coil 142. One connecting arm 141 further has a second positioning coil 143 formed at a distal end to the first positioning coil 142, the other connecting arm 141 further has an arcuate resisting portion 144 formed at a distal end to the first positioning coil 142. The first positioning coil 142 and the second positioning coil 143 are configured to coil around two of the four positioning columns 1211 to secure the slider 14 to the slide plate 12. The resisting portion 144 resists against the guide portion 131 during the sliding process of the sliding mechanism 10. The slider 14 is provided with a certain rigidity to deform the guide portion 131 during the sliding process.

Figure 4:
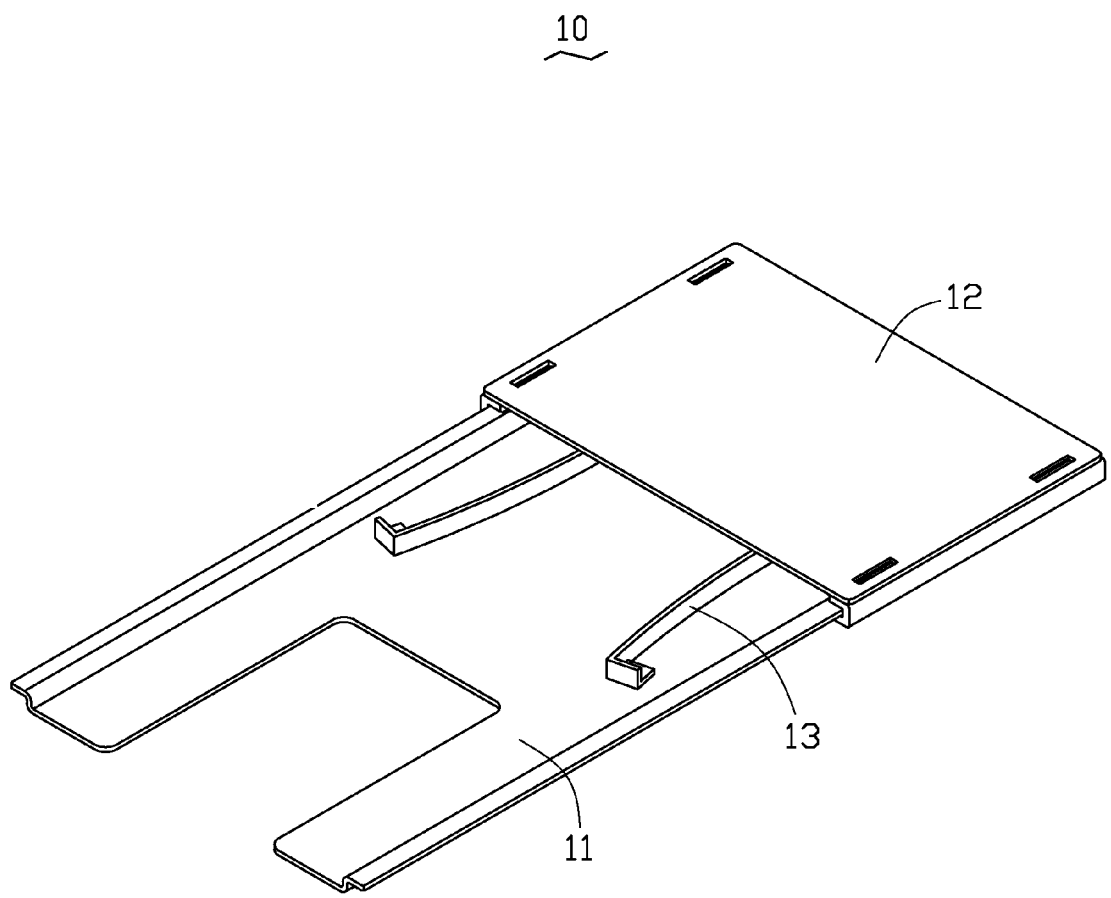
FIG. 4 is an isometric and assembled view of the slide mechanism shown in FIG. 2.
Figure 5:
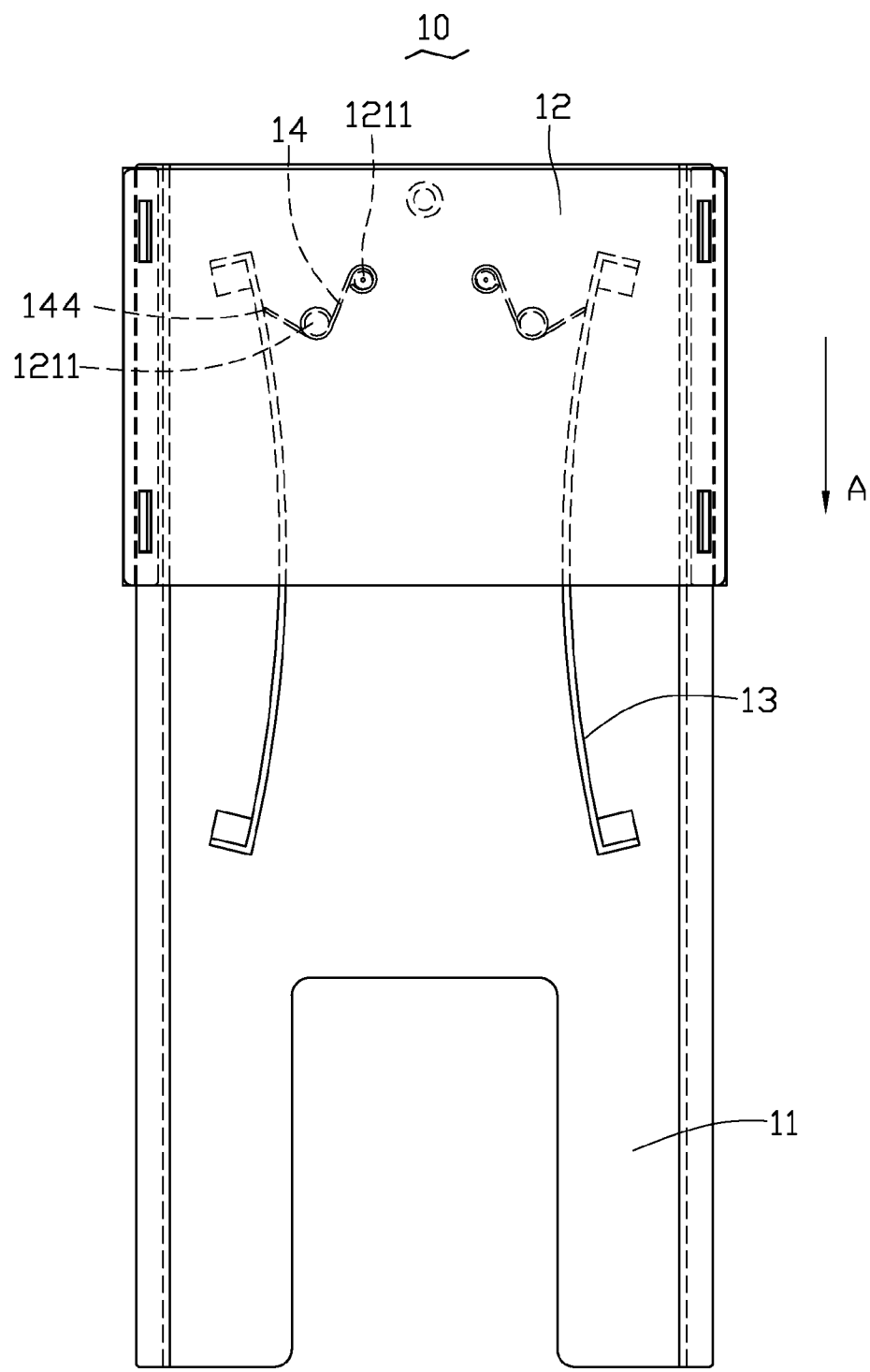
FIG. 5 is a perspective view of the slide mechanism in FIG. 4 in an opened position.

Referring to FIGS. 4 and 5, when the slide mechanism 10 is assembled, the slide plate 12 covers a part of the main plate 11 and can slide along by the sliding of the slide portions 122 along the rail portions 112. The rail portions 112 are received in and can linearly slide within the slide grooves 1221. The guiders 13 and the sliders 14 are located between the slide plate 12 and the main plate 11. The two guide portions 131 are symmetrically arranged on a surface of the main base portion 111 with their convex sides extending toward each other. There is a distance between the guide portions 131 perpendicular to arrow line A. The distance is initially decreased along a direction designated by the arrow line A, minimized at the middle of the guide portions 131, and then increased further along the line A. The two sliders 14 are symmetrically arranged on a surface of the slide base portion 121 with their resisting portions 144 away from each other toward the corresponding guide portion 131 and their second positioning coils 143 toward each other. The resisting portions 144 abuts the guide portions 131 without any compression generated between them. The sliders 14 are positioned between the guiders 13. At this time, the guide portions 131 and the slide portions 41 are at their original state. The slide mechanism 10 can be at an opened position and the portable electronic device 20 can be at an opened state accordingly.

Referring to FIG. 7, the slide mechanism 10 is at a closed position and the portable electronic device 20 is at a closed state. The slide plate 12 slides along the main plate 11 to reach the closed position to cover another part of the main plate 11. The second housing 22 covers the keypad 32. The resisting portions 144 engage with the guide portions 131 without any compression generated between them.

Figure 6:
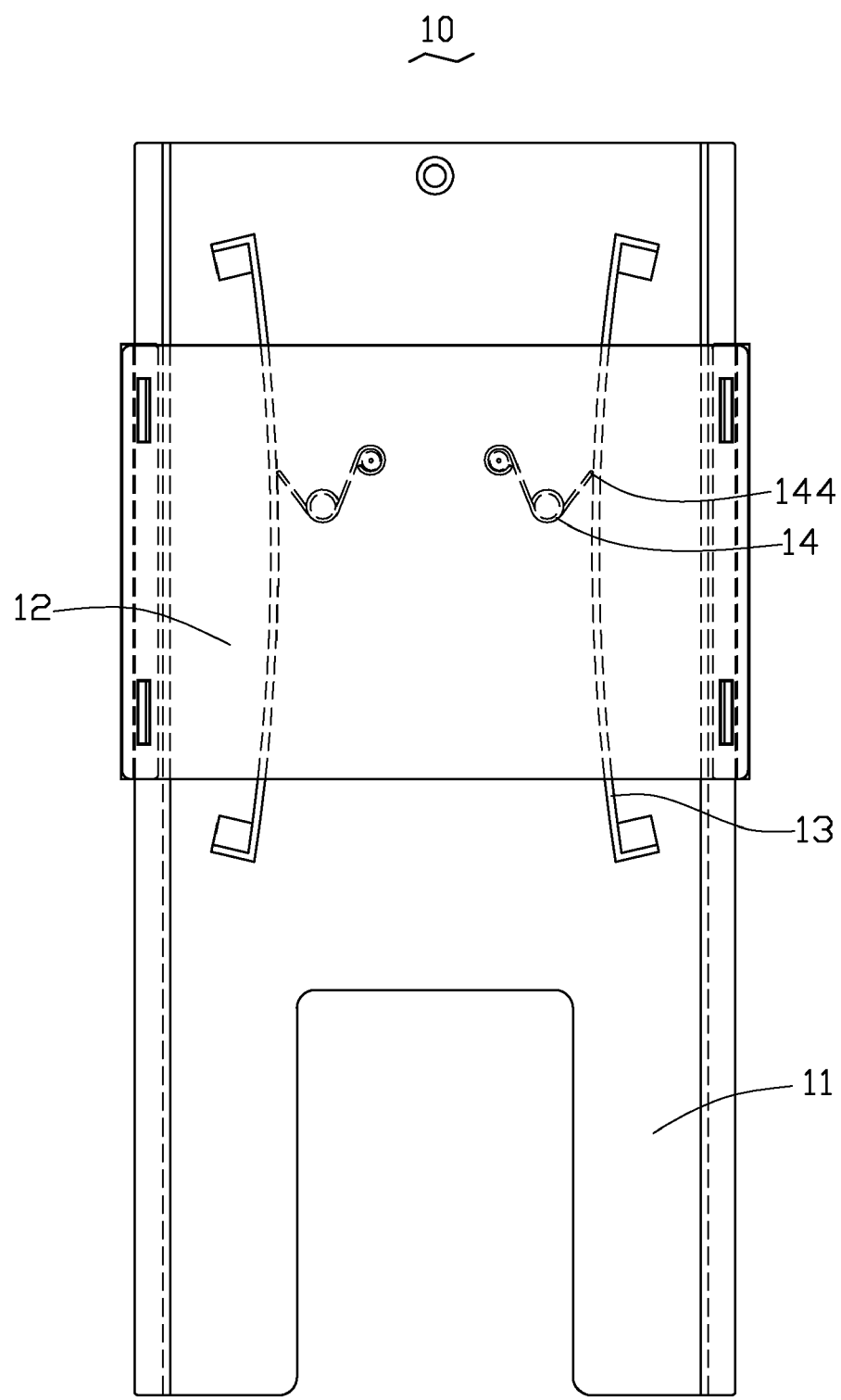
FIG. 6 is similar to FIG. 5, but in a critical position.

Referring back to FIG. 5, when the slide mechanism 10 is driven from the opened position to the closed position, the slide plate 12 slides along the main plate 11 by exerting an external force along line A. During this stage, the resisting portion 144 deforms the guide portions 131. Referring to FIG. 6, the slide plate 12 reaches a critical position relative to the main plate 11. At this position, the guide portions 131 are compressed by the resisting portion 144 with a maximized deformation. After that, the slide plate 12 can further automatically slide towards the closed position by returning the guide portions 131 from their compressed states to their original states.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A slide mechanism, comprising:
a main plate;
a slide plate installed on the main plate and slidable relative to the main plate; and comprising four positioning columns;
two sliders attached to the slide plate, each of the two sliders comprising two connecting arms, a first positioning coil, a second positioning coil, and a resisting portion, the two connecting arms connected at an acute angle, forming the first positioning coil at the conjunction of the two connecting arms, one of the two connecting arms having an end coiled to form the second positioning coil, the other of the two connecting arms having an end arcuately extending to form the resisting portion, the first positioning coil and the second positioning coil coiling around two of the four positioning columns to secure the slider to the slide plate; and
two deformable guiders attached to the main plate and configured for deforming and deformably guiding the sliders to move therealong, the sliders positioned between the guiders;
wherein during the sliding process of the slide plate with respect to the main plate, the resisting portions directly abut against and deform the guiders to allow sliding of the slide plate along the main plate.

2. The slide mechanism as claimed in claim 1, wherein the slider is provided with a certain rigidity to deform the guide portion during the sliding process.

3. The slide mechanism as claimed in claim 2, wherein:
each guider comprises an elastic guide portion, the guide portions deformably guiding the slider to move therealong, the resisting portion abuts and deforms a guide portion to only generate the deformation of the guide portion.

4. The slide mechanism as claimed in claim 3, wherein the guide portions are arcuate sheets.

5. The slide mechanism as claimed in claim 3, wherein the two guide portions are systematically arranged on the main plate with one extending outward towards the other.

6. The slide mechanism as claimed in claim 1, wherein the main plate comprises two rail portions, and the slide plate forms two slide portions, the slide portions sliding along the rail portions.

7. The slide mechanism as claimed in claim 6, wherein the slide portions define two slide grooves, the rail portions received in the slide grooves and configured for linearly sliding within the slide grooves.

8. A portable electronic device, comprising:
a first housing;
a second housing slidably installed on the first housing;
a slide mechanism, comprising:
a main plate;
a slide plate installed on the main plate and slidable relative to the main plate, and comprising four positioning columns;
two sliders attached to the slide plate, each of the two sliders comprising two connecting arms, a first positioning coil, a second positioning coil, and a resisting portion, the two connecting arms connected at an acute angle, forming the first positioning coil at the conjunction of the two connecting arms, one of the two connecting arms having an end coiled to form the second positioning coil, the other of the two connecting arms having an end arcuately extending to form the resisting portion, the first positioning coil and the second positioning coil coiling around two of the four positioning columns to secure the slider to the slide plate; and
two deformable guiders attached to the main plate and configured for deformably guiding the sliders to move therealong, the sliders positioned between the guiders;
wherein during the sliding process of the slide plate with respect to the main plate, the resisting portions directly abut against and deform the guiders to allow sliding of the slide plate along the main plate.

9. The portable electronic device as claimed in claim 8, wherein the slider is provided with a certain rigidity to deform the guide portion during the sliding process.

10. The portable electronic device as claimed in claim 9, wherein:
each guider comprises an elastic guide portion, the guide portions deformably guiding the slider to move therealong, the resisting portion abuts and deforms a guide portion to only generate the deformation of the guide portion.

11. The portable electronic device as claimed in claim 10, wherein the guide portions are arcuate sheets.

12. The portable electronic device as claimed in claim 10, wherein the two guide portions are systematically arranged on the main plate with one extending outward towards the other.

13. The portable electronic device as claimed in claim 8, wherein the main plate comprises two rail portions, and the slide plate forms two slide portions, the slide portions sliding along the rail portions.

14. The portable electronic device as claimed in claim 13, wherein the slide portions define two slide grooves, the rail portions received in the slide grooves and configured for linearly sliding within the slide grooves.

* * * * *